United States Patent [19]
Bellows et al.

[11] Patent Number: 5,122,976
[45] Date of Patent: Jun. 16, 1992

[54] METHOD AND APPARATUS FOR REMOTELY CONTROLLING SENSOR PROCESSING ALGORITHMS TO EXPERT SENSOR DIAGNOSES

[75] Inventors: James C. Bellows, Maitland; Daniel E. Fridsma, Winter Springs, both of Fla.

[73] Assignee: Westinghouse Electric Corp., Pittsburgh, Pa.

[21] Appl. No.: 491,926

[22] Filed: Mar. 12, 1990

[51] Int. Cl.$^5$ .......................................... G06F 15/46
[52] U.S. Cl. ................................... 364/550; 395/906; 364/551.01; 364/580
[58] Field of Search ................... 364/550, 551.01, 513, 364/131, 138, 571.01, 572, 574, 580

[56] References Cited

U.S. PATENT DOCUMENTS

| | | | |
|---|---|---|---|
| 4,642,782 | 2/1987 | Kemper et al. | 364/550 |
| 4,644,479 | 2/1987 | Kemper et al. | 364/550 |
| 4,649,515 | 3/1987 | Thompson et al. | 364/900 |
| 4,698,756 | 10/1987 | Gonzalez et al. | 364/557 |
| 4,910,691 | 3/1990 | Skeirik | 364/138 |
| 4,931,962 | 6/1990 | Palleiko | 364/550 |
| 4,931,967 | 6/1990 | Boe et al. | 364/571.01 |
| 4,947,095 | 8/1990 | Kawamura et al. | 318/569 |
| 4,951,234 | 8/1990 | Bellows | 364/550 |
| 4,959,799 | 9/1990 | Yoshiura et al. | 364/513 |
| 4,967,337 | 10/1990 | English et al. | 364/184 |
| 4,985,857 | 1/1991 | Bajpa et al. | 364/551.01 |
| 4,989,162 | 1/1991 | Tanaka et al. | 364/513 |
| 5,023,045 | 6/1991 | Watanabe et al. | 376/215 |
| 5,041,976 | 9/1991 | Marko et al. | 364/424.03 |

OTHER PUBLICATIONS

T. H. Pierce, B. A. Hohne, Artificial Intelligence Applications in Chemistry, 1986.
I. J. King, R. B. Chianese, D. E. Fridsma, R. L. Frater, Turbine-Generator On-Line Diagnostic System, ASME/IEEE 1987.
A. Moradian, P. L. Wilhelm, S. S. Palusamy, Artificial Intelligence Applications to Electric Power Plant On-Line Diagnostics, 1990.
M. P. Chow, R. B. Chianese, D. E. Fridsma, K. E. Harper, I. J. King, & R. L. Osborne, Initial Experience With An On Line Steam Turbine Expert Diagnostic System, ASME, PWR-vol. 3, no date.
A. Moradian, R. F. Gray, P. L. Wilhelm, Generator Artificial Intellignece Diagnostics On-Line Experience, EPRI, no date.
J. Carlson, M. Coffman, TU Electric Experience With On-Line Generator Monitoring and Diagnostics, EPRI, 1987.
R. F. Gray and I. J. King, User Interface Graphically Improves Generator AI Diagnostics, IEEE, 1991.
ChemAid, Chemistry Artificial Intelligence Diagnostics, 1987.
GenAID, Generator Artificial Intelligence Diagnostics, no date.
J. C. Bellows & K. L. Weaver, An On-Line Steam Cycle Chemistry Diagnostic System, ASME, 1988.
Bellows et al., On-Line Steam Cycle Chemistry Daignosis, Proceedings: Second Fossil Plant Cycle Chemistry Conference, 1989.
Bellows et al. On-Line Chemistry Diagnostics, Official Proceedings The International Water Conference, 1988.
C. Kemper & K. E. Harper, The PDS Manual, Nov. 1987, Title and Table of Contents Pages.
Wallich, "Software 'Doctor' Prescribes Remedies", Oct. 1986, IEEE Spectrum, pp. 43-48.

*Primary Examiner*—Thomas G. Black

[57] ABSTRACT

A system is disclosed including a data center computer for data collection and process control of a complex processing plant. The data center computer collects raw sensor data. The raw data is sent, by a conventional communicator routine, to a remote expert system for sensor diagnosis of faulty sensors. The diagnostic results, which include a calculation control value, are returned to the data center computer where the results are used to control sensor processing routines used to either control the plant based on the collected raw sensor data or to further process the sensor data. The further processed sensor data can then be used for high level system diagnoses.

10 Claims, 7 Drawing Sheets

| MESSAGE NODE | CF Max. | CF Min. | VALUE |
| --- | --- | --- | --- |
| INTERPOLATION-1 | 0 | -1 | 1 |
| INTERPOLATION-2 | .5 | 0 | 2 |
| INTERPOLATION-3 | 1 | .5 | 3 |
| ⋮ | ⋮ | ⋮ | ⋮ |
| INTERPOLATION-n | | | |

METHOD AND APPARATUS FOR REMOTELY CONTROLLING SENSOR PROCESSING ALGORITHMS TO EXPERT SENSOR DIAGNOSES

BACKGROUND OF THE INVENTION

1. Field of the Invention

The present invention is a method of controlling remotely located calculation algorithms based on expert system diagnoses and, more particularly, allows the diagnosis of sensor failure by a remotely located expert system and the transfer of the results of the diagnosis to a sensor sampling and plant control system which controls sensor calculations and control calculation based on the diagnosis.

2. Description of the Related Art

Complex calculations are currently done by plant data centers located at complex plants such as electric power generating plants. An example a complex calculation is a thermodynamic turbine efficiency calculation. Such a calculation is based on on-line data and a bad sensor value can produce ridiculous results, such as turbine efficiencies greater than 100% or less than 0%. Since turbine efficiency is used by the plant operator to guide control operations attempting to maximize plant efficiency, bad calculation results can prevent the operator from obtaining maximum plant efficiency. To cope with the bad calculation problem, complex sensor analysis algorithms are provided in the data center computer to cope with the many possible problems that sensors can experience. When a new sensor problem occurs, the complex sensor analysis algorithms frequently break down and the complex calculations based on uncorrected sensor values are performed. What is needed is a method of performing sensor diagnosis which relieves the plant data center computer from the task of sensor diagnosis and allows the plant data center computer to concentrate on on-line data acquisition and process control.

The remotely located diagnostic centers continue to receive bad data in such situations, and, as a result, faulty high level system diagnoses are made or the diagnostic system simply sends a message to the plant operator indicating that the sensor must be fixed before certain high level diagnoses can be made. Currently no communication is performed between the data collection routine and the expert diagnostic system. What is needed is a method allowing the sensor scan and processing routines to communicate with the diagnostic system.

SUMMARY OF THE INVENTION

It is an object of the present invention to provide a system that allocates the tasks of sensor diagnosis and control to the types of software that perform these tasks most efficiently.

It is another object of the present invention to relieve the data center computer in a complex process control plant of the sensor diagnosis tasks.

It is a further object of the present invention to provide a sensor diagnosis system and calculation control system that provides sufficient flexibility that when new sensor problems occur a breakdown does not occur.

It is also an object of the present invention to control calculations based on sensor values adjusted in response to diagnostic results on the sensors.

It is an object of the present invention to provide a system that allows a diagnostic system that controls data center calculations to be centrally maintained to operate with many data center computers for many different plants, thereby allowing all changes and updates to the diagnostic system to be provided to all users at the same time.

The above objects can be attained by a system that uses a data center computer, used for data collection and process control of a complex processing plant, to collect raw sensor data which is sent to a remote expert system for sensor diagnosis. The diagnostic results are returned to the data center computer where the results are used to control sensor processing routines used to control combine sensor signals and to the plant based on the collected sensor data.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
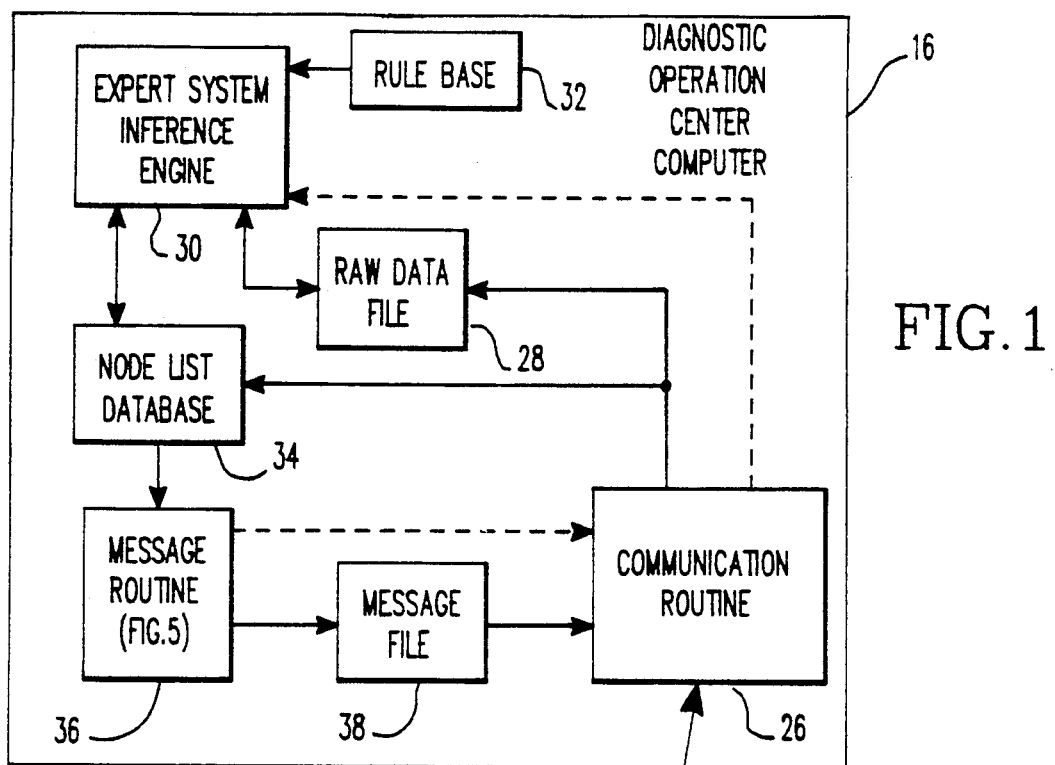
FIG. 1 illustrates the operation and components of the present invention.
Figure 1:
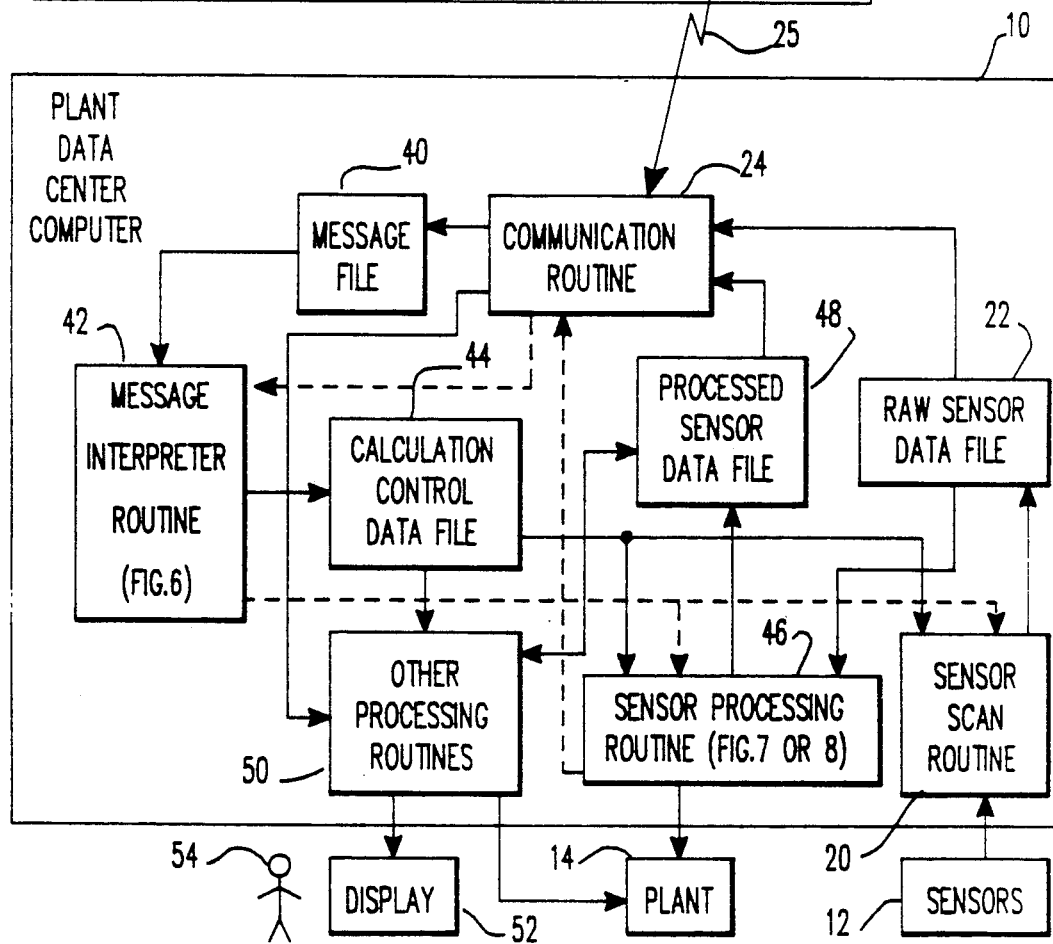

As illustrated in FIG. 1 a plant data center computer 10, such as a Digital Equipment Micro VAX computer, obtains sensor data from sensors 12 and uses that data to control a complex processing plant 14 such as a nuclear or fossil-fueled power plant. The present invention rather than have the data center computer 10 perform sensor analysis and continues processing when sensors are faulty, transmits the sensor data to a diagnostic operation center computer 16, such as a Digital Equipment VAX computer which diagnoses sensor problems using an expert system such as the PDS (Process Diagnostic System) available from Westinghouse and described in U.S. Pat. Nos. 4,644,479 and 4,649,515 incorporated by reference herein. Other expert systems, of course, could be used for the sensor diagnostic task as long as they have the capability of diagnosing sensor malfunctions. During operation a conventional sensor scan routine 20 in the plant computer 10 scans the sensors 12 and loads the sensor data into a raw sensor data file 22. The collated sensor data is deadbanded. A conventional communication router routine or utility, such as DEC-NET available on the Digital Equipment VAX VMS computer systems, formats the sensor data into a message and transmits the deadbanded sensor data over a conventional communication network such as a telephone line or a microwave data communication system to the operation center diagnostic computer 16. A corresponding communication routine 26 parses the message and stores the raw sensor data in a raw sensor data file 28. When the file 28 is complete, an expert system 30 is informed (as indicated by the dashed line) and the raw sensor data is accessed by the expert system inference engine 30, such as the PDS system previously mentioned, which uses rules in a rulebase 32 to diagnose faulty sensors. The results of the diagnosis are stored in a node list database 34 maintained internally to PDS. This list is accessible through a PDS utility. PDS also produces two output files, the first is a complete list of all malfunction nodes with a confidence above 0.0 and is used by people monitoring the diagnostic system, and the second is a list of all malfunction nodes with a confidence above 0.5 and is sent to the display 52 in the plant data center 10. Each diagnosis has associated therewith a diagnostic indicator or value which, as will be discussed in more detail later, is used by the data center computer 10 to control subsequent sensor processing. Once a complete diagnosis of sensor malfunctions has been completed, a message routine 36, illustrated in more detail in FIG. 5, accesses the node list database for sensor processing control messages and stores the messages in a message file 38. Once the message routine is finished and the dynamic message file has been created, the communication routine 26 is activated to transfer the contents of the message file 38 to the communication routine 24 which creates a corresponding message file 40. Once the communication routine has completed creating the message file 40, a message interpreter routine 42, illustrated in more detail in FIG. 6, is started which reviews the messages and stores the sensor processing routine control values in appropriate locations in a calculation control data file 44. Sensor processing routines, examples of which are illustrated in more detail in FIGS. 7 and 8, once the message interpreter routine 42 has completed execution, obtained the calculation control data from file 44 and process the raw sensor data into processed sensor data which is stored in an appropriate file 48 or perform actual process control operations on the plant 14. Although the Figure indicates that the routine 42 can wake up the routines 46, it is preferable that the routines 46 wake up based on a timed interrupt basis. When the control value indicates a change in a parameter of the scan routine, such as changing the scan cycle from 10 seconds to 20 seconds in an attempt to reduce transient noise, the sensor scan routine 20 can obtain the control value and make appropriate scan cycle adjustments. It is also possible for the deadband limits for the sensor can be adjusted. When processed sensor data is produced for file 48, the communication routine 24 can then send the processed sensor data to the diagnostic computer 16 which can use the expert system previously discussed to perform high level diagnostic operations, such as for determining whether maintenance on a piece of equipment such as a generator should be performed. The results of such higher level diagnostic operations can be communicated back to the data center computer 10 where other processing 50 routines such as display processing routines can provide the results of the higher level diagnoses to a display 52 for review by an operator 54. The sensor data 22 as it is processed, based on the diagnosis, can also be immediately used for control operations rather than first storing it as a file 48 and then performing control operations.

A system such as that illustrated in FIG. 1 shifts the burden of sensor malfunction diagnosis to a type of software which is capable of more efficiently performing such diagnoses. This system also relieves the data center computer 10 of the burden of sensor diagnosis. Such a system also allows plants with smaller data center computers to take advantage of complex calculation systems which require accurate sensor data, such as plant efficiency calculation systems, without having to retrofit the plant data center computer with complex sensor analysis software.

Figures 2, 3:
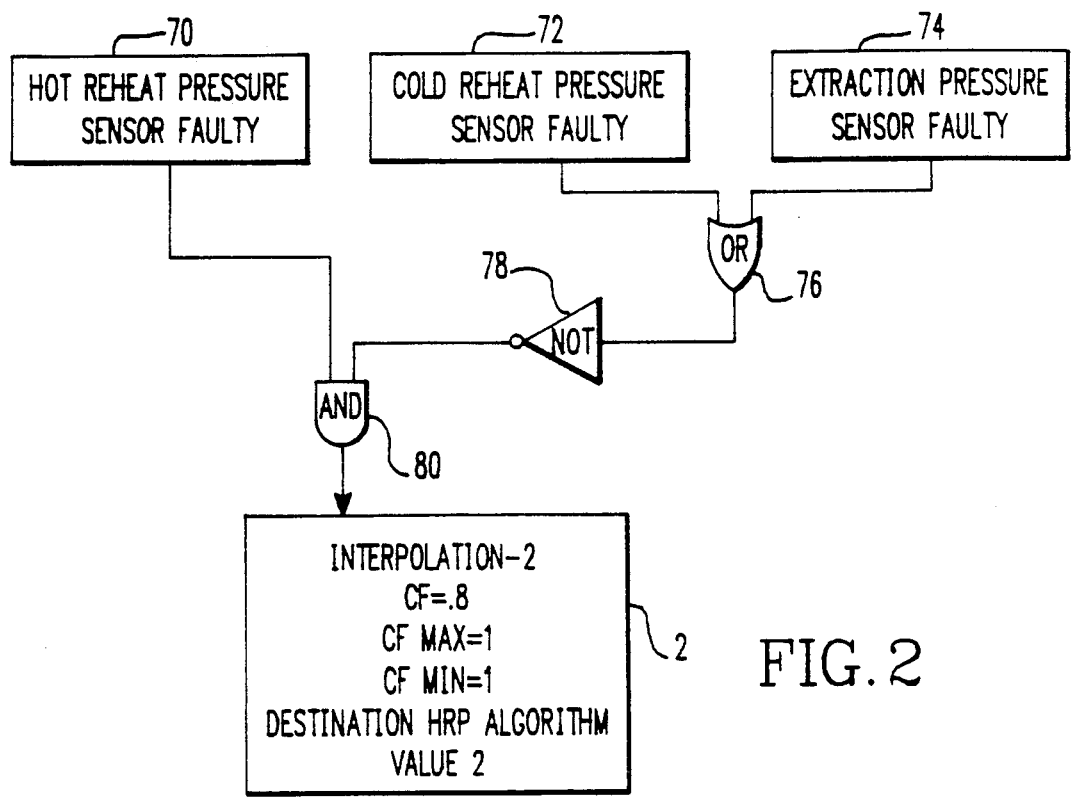
FIG. 2 illustrates an example of a rule for diagnosing faulty sensors.
FIG. 3 illustrates a matrix of diagnostic results.

FIG. 2 illustrates the operation of a typical rule for producing a calculation control value associated with hot reheat pressure sensors. The rule illustrated in FIG. 2 has as inputs results of diagnoses associated with the hot reheat pressure sensor 70, the cold reheat pressure sensor 72 and the extraction pressure sensor 74. The diagnoses for the sensors themselves are within the skill of the ordinarily skilled expert system knowledge engineer and perform relatively simple tasks such as testing the raw sensor data against valid data range limits. The logic of this rule depicted by OR gate 76, NOT gate 78 and AND gate 80 produces a message node 82 output that indicates that the confidence that the reheat pressure sensor has failed is between 0.6 and 1.0, and that the reheat pressure algorithm should use routine 2 (interpolation between cold reheat pressure and first IP extraction pressure) rather than routine 1 (transfer pressure sensor reading). The calculation control communication to the heater reheat pressure algorithm is communicated using the diagnostic value which in this situation is 2. In this particular example the value communicated indicates the interpolation routine to be used and of course the diagnostic value could control calculations in other ways such as actually being substituted for sensor data or indicating that sensor data should be substituted with a predefined data value. Of course, since the combination of faulty sensors in the above example can result in eight different combinations, eight different rules or different logical operations corresponding to the combinations must be represented in the rulebase 32. The results of these different rules can be represented in a table such as illustrated in FIG. 3 which shows that each rule or message has a corresponding control value which is selected based on the confidence factor of the rule execution. In such a representation the confidence factor output of the rule could be used to access such a table and designate a message node 82 with the control value therein.

Figure 4:
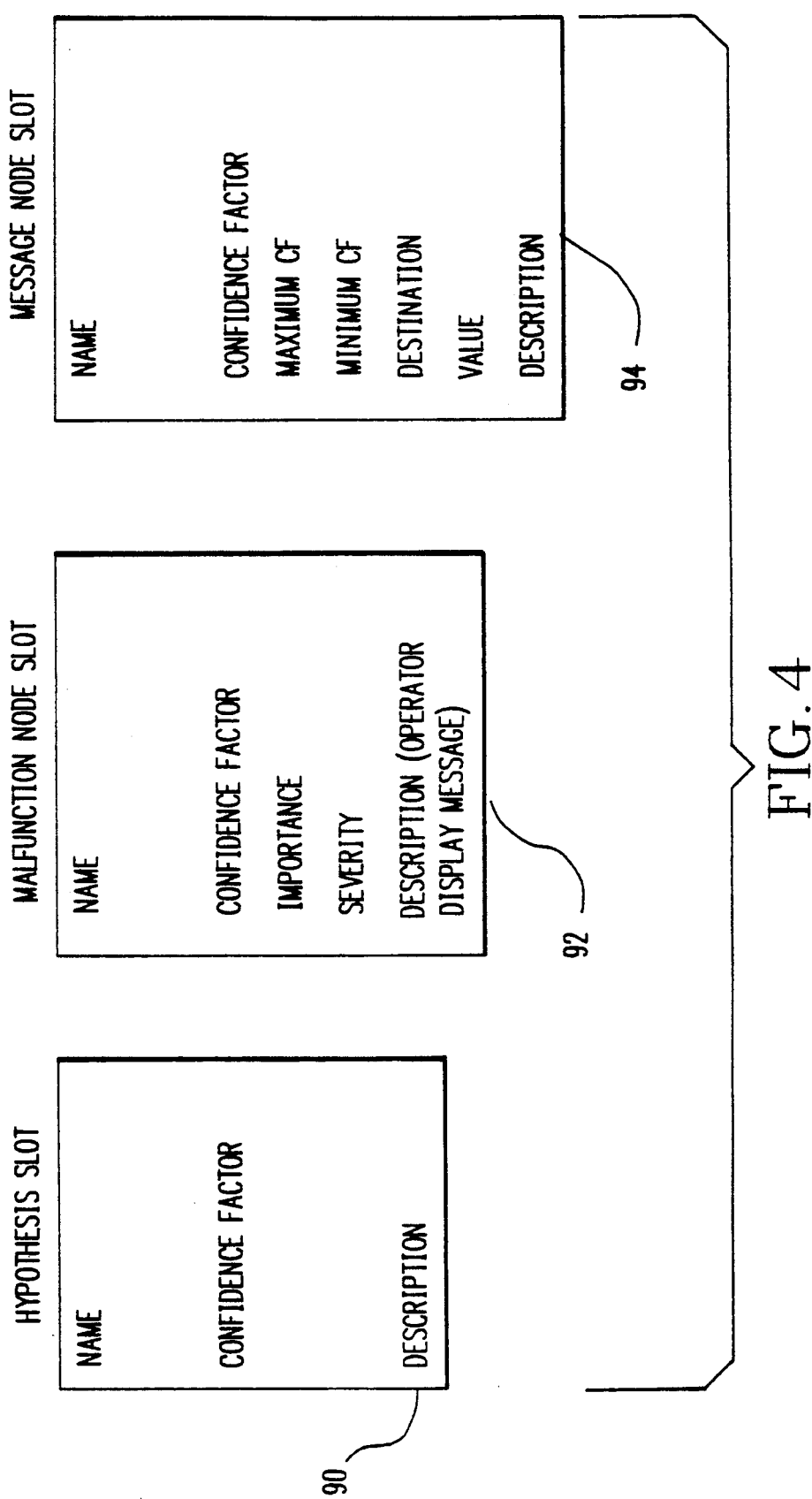
FIG. 4 depicts the data structures used by the preferred expert system used in the present invention.

In an expert system such as PDS each node in the system has associated therewith a set slot. FIG. 4 illustrates the hypothesis node 90 slots, malfunction node 92 slot and the message node 94 slots as would be used by the preferred expert system when producing the diagnoses stored in the node list data base 34. As a result of the sensor diagnosis by the expert system inference engine, the node list database is filled with message slots as illustrated by the block 94 in FIG. 4.

Figure 5:
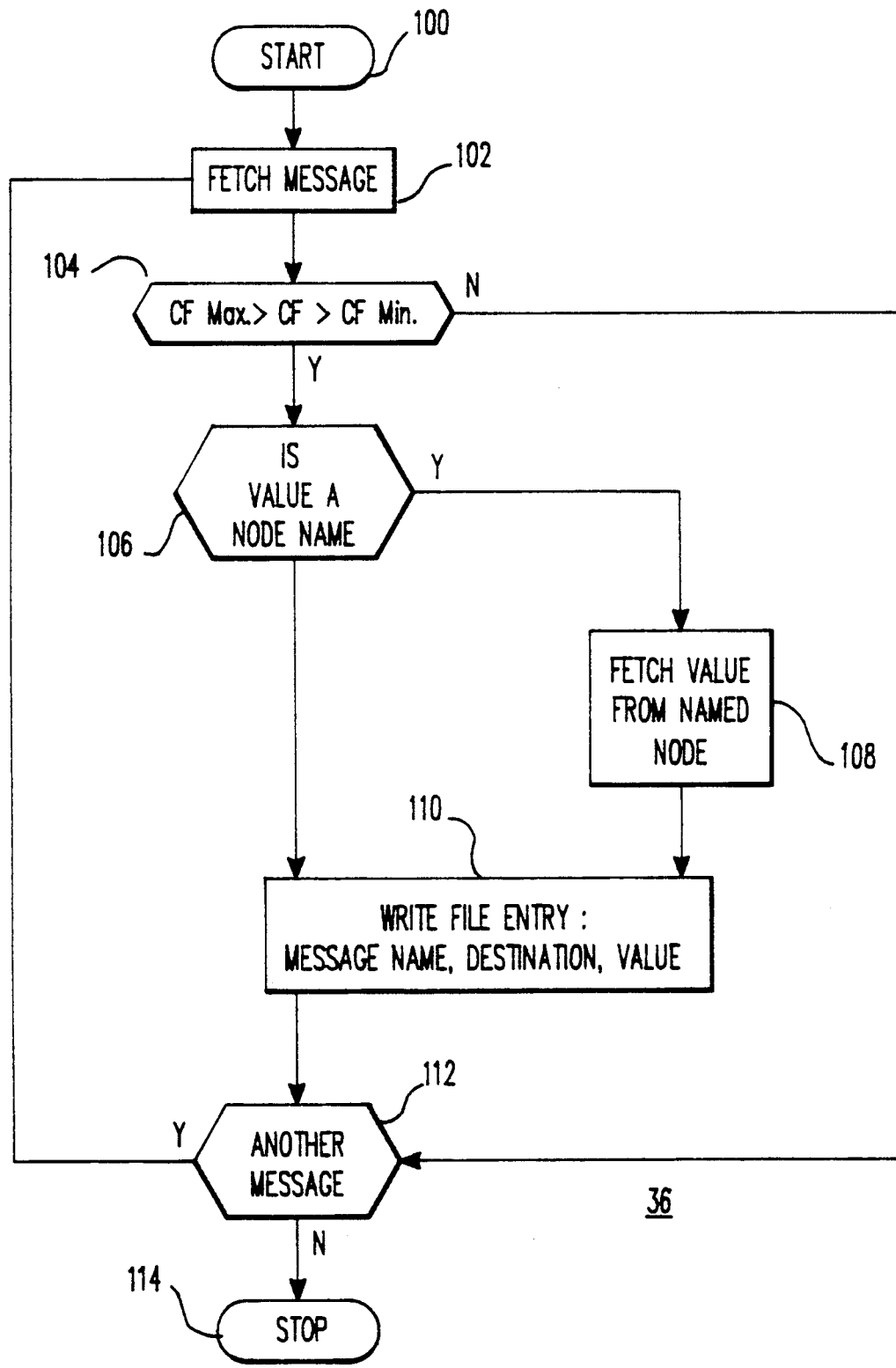
FIG. 5 illustrates expert system diagnostic message processing.
Figure 6:
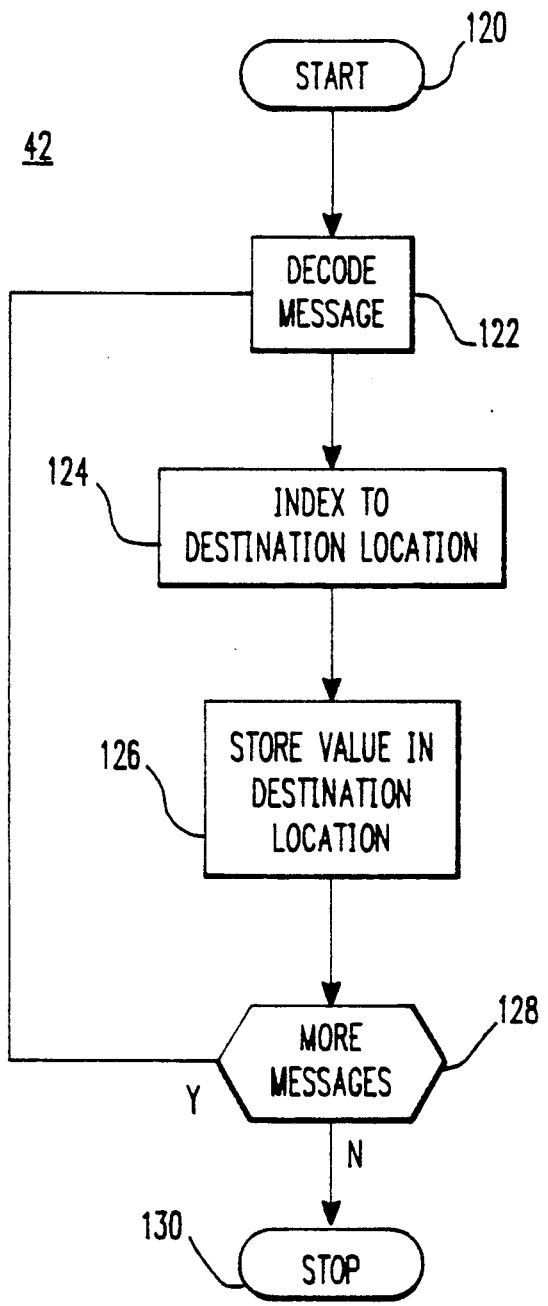
FIG. 6 illustrates message processing by the plant data center computer.

The message list database is scanned by the message routine 36 until a message node slot is encountered and the contents of this message node slot are fetched 102, as illustrated in FIG. 5. If the confidence factor falls 104 between the maximum and minimum confidence factors, a test 106 is performed on the value field of the message node slot to determine whether the value field includes a node name. By allowing actual integer values as well as node names to occupy the value field indirect references to calculation control values for the sensor processing routines can be provided. This allows many different diagnostic rules to refer to the same diagnostic control value making changes to the control values easy. This also allows other rules to calculate control values, such as a sensor average and place them in an indirectly accessed variable node. If the value is a node name the value is fetched 108 from the named node and then a file entry, which includes the message name, the destination and the value, is stored 110 in message file 38. If no additional messages are encountered 112, the routine stops.

When the message file 40 has been completed the message interpreter routine 42, as illustrated in more detail in FIG. 6, stores the sensor processing routine control values in the appropriate locations of the calculation data control file 44. This routine first decodes 122 the message to separate the message name, destination and control value. The destination is used in an index file, called a section file in VMS, to find 124 the actual location of the place where the message value should be stored and then the message value is stored 126 in that destination location. If no more messages exist 128, the system stops.

Figure 7:
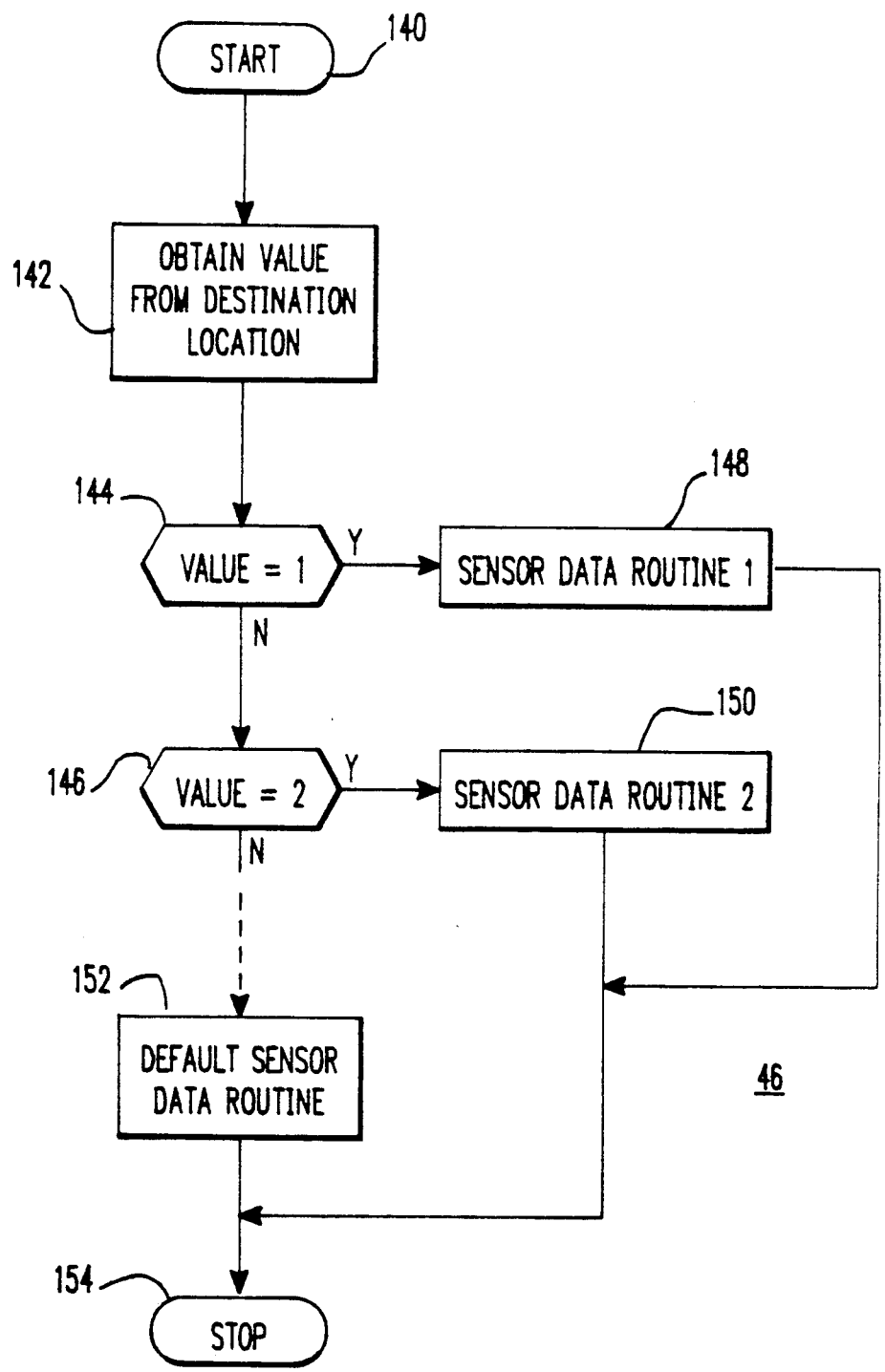
FIGS. 7 and 8 depict alternative methods of performing sensor processing based on diagnostic results.
Figure 8:
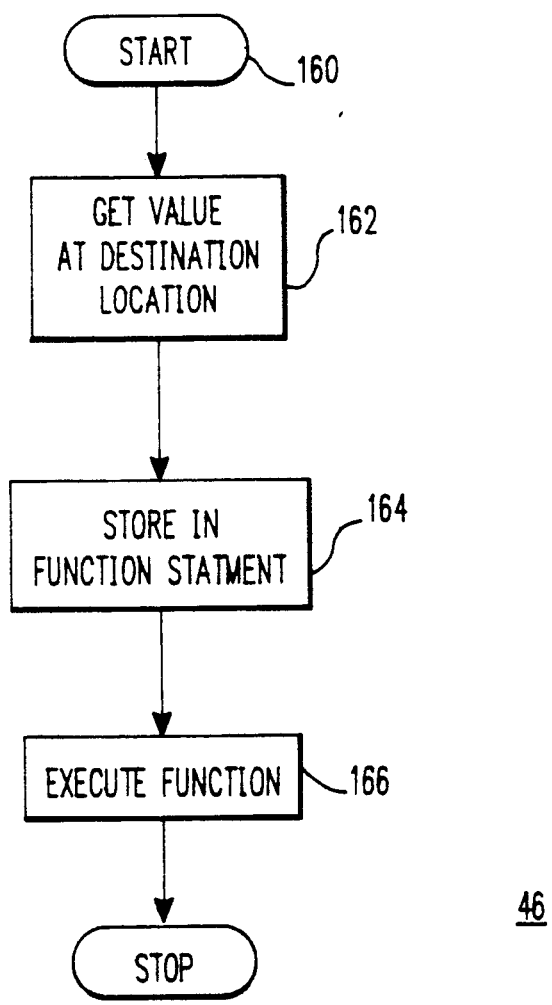

The operation of the sensor processing routines are illustrated in more detail in FIGS. 7 and 8. Prior to executing the actual calculations of a sensor processing routine the computer 10 first obtains 142 the appropriate control value from the destination location. This control value is tested 144 and 146 looking for a match to previously identified control values which correspond to different sensor data routines 148 and 150. If a match occurs the corresponding sensor data routine is executed. For example, if the sensor calculations normally use the average of three sensors, the average of two sensors can be computed when a sensor is bad and the control value indicates a two sensor average. Another possibility is for the control value to indicate sensor weights in a weighted average or even that a virtual sensor value should be calculated from different sensors. If a match does not occur, a default sensor data routine 152 is performed. As an alternative to essentially performing subroutine calls as illustrated in FIG. 7, the present invention could execute the appropriate routines through the function capability available in a language such as FORTRAN. In such a situation the function type execution routine, as illustrated in FIG. 8, would first get 162 the appropriate control value at the destination location and store 164 this value in the appropriate field of a function statement. The function statement would then be executed 166. It is also possible for the sensor processing routine to load a predetermined or calculated value into a common data storage area.

The many features and advantages of the invention are apparent from the detailed specification and, thus, it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus, comprising:
   control means for sampling sensor data and performing sensor data processing; and
   diagnostic means for diagnosing a sensor malfunction using the sensor data, and said control means performing the sensor data processing responsive to the diagnosis.

2. An apparatus as recited in claim 1, wherein said diagnostic means transmits a control parameter controlling sensor data processing by said control means.

3. An apparatus as recited in claim 1, wherein said diagnostic means comprises an expert system.

4. An apparatus as recited in claim 1, wherein said diagnostic means is located remotely with respect to said control means.

5. An apparatus as recited in claim 1, wherein a confidence factor in the diagnosis determines the sensor data processing performed by said control means.

6. An apparatus as recited in claim 1, wherein said diagnostic means communicates the results of the diagnoses to said control means using a message including a routine destination name and a control value indicating a type of sensor data processing to be performed by the destination routine.

7. An apparatus for controlling sensor data calculations comprising:
   a process control computer for sampling sensor data and performing sensor data processing responsive to a diagnostic message;
   a communication link coupled to said process control computer for transmitting the sensor data and the diagnostic message;
   an expert system diagnostic computer coupled to said communications link for producing the diagnostic message by diagnosing malfunctioning sensors based on the transmitted sensor data.

8. A method of controlling sensor data calculations, comprising the steps of:
   (a) sampling sensors to obtain raw sensor data;
   (b) performing an expert system diagnoses on the raw sensor data to produce a sensor diagnosis; and
   (c) selectively performing sensor data processing responsive to the diagnoses.

9. A method as recited in claim 8, further comprising communicating the diagnosis via a message that designates a destination routine and contains a processing routine control value.

10. A system that controls sensor data calculations responsive to a sensor diagnosis, comprising:
    control means for sampling sensor data and performing sensor data processing; and
    diagnostic means for diagnosing a sensor malfunction using the sensor data, and said control means performing the sensor data processing responsive to the diagnosis and said diagnostic means including a data
    structure for communicating the sensor diagnosis and comprising a message node including a confidence factor in the diagnosis, a destination routine indicator and a calculation control value.

* * * * *